US012562859B2

(12) United States Patent
Karjalainen et al.

(10) Patent No.: US 12,562,859 B2
(45) Date of Patent: Feb. 24, 2026

(54) METHODS AND APPARATUSES FOR TIME AND FREQUENCY TRACKING REFERENCE SIGNAL USE IN NEW RADIO

(71) Applicant: Nokia Technologies Oy, Espoo (FI)

(72) Inventors: Juha Karjalainen, Oulu (FI); Timo Koskela, Oulu (FI); Sami Hakola, Kempele (FI); Mihai Enescu, Espoo (FI); Mikko Mäenpää, Tampere (FI); Jorma Kaikkonen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/763,644

(22) PCT Filed: Nov. 6, 2018

(86) PCT No.: PCT/IB2018/058722
§ 371 (c)(1),
(2) Date: May 13, 2020

(87) PCT Pub. No.: WO2019/097356
PCT Pub. Date: May 23, 2019

(65) Prior Publication Data
US 2020/0366351 A1      Nov. 19, 2020

Related U.S. Application Data

(60) Provisional application No. 62/587,706, filed on Nov. 17, 2017.

(51) Int. Cl.
*H04L 5/00* (2006.01)
*H04B 7/06* (2006.01)
(Continued)

(52) U.S. Cl.
CPC ......... *H04L 5/0048* (2013.01); *H04B 7/0626* (2013.01); *H04L 5/0051* (2013.01);
(Continued)

(58) Field of Classification Search
CPC ..... H04L 5/0048; H04W 4/029; H04B 7/0626
See application file for complete search history.

(56) References Cited

U.S. PATENT DOCUMENTS

2013/0114535 A1* 5/2013 Ng .................... H04W 72/0446
370/329
2015/0349940 A1 12/2015 Kim et al.
(Continued)

FOREIGN PATENT DOCUMENTS

JP     2016-511563 A     4/2016

OTHER PUBLICATIONS

"3rd Generation Partnership Project; Technical Specification Group Radio Access Network; NR; Physical layer procedures for data (Release 15)", 3GPP TS 38.214, V15.2.0, Jun. 2018, pp. 1-95.
(Continued)

*Primary Examiner* — Yee F Lam
(74) *Attorney, Agent, or Firm* — SQUIRE PATTON BOGGS (US) LLP

(57) ABSTRACT

Systems, methods, apparatuses, and computer program products for time and frequency tracking reference signal (TRS) use in new radio (NR) are provided. One method may include defining an information element as a part of a channel state information reference signal (CSI-RS) resource set definition to indicate, to a user equipment, the channel state information reference signal (CSI-RS) resource(s) or synchronization signal block (SSB) resources used for tracking reference signal (TRS) purposes. The method may then include transmitting the information element to the user equipment to make it aware of the channel (Continued)

Defining an information element as a part of CSI-RS resource or resource set definition to indicate, to a UE, the CSI-RS resource(s) and/or SSB resource(s) to be used for TRS purposes — 500

Configuring the UE with the information element to make UE aware of different CSI-RS resource(s) and/or SSB resource(s) within a CSI-RS resource set targeted for TRS specific operation — 510 state information reference signal (CSI-RS) resources within one or more channel state information reference signal (CSI-RS) resource sets targeted for tracking reference signal (TRS) specific operation.

20 Claims, 5 Drawing Sheets

(51) Int. Cl.
    *H04L 27/26*         (2006.01)
    *H04W 56/00*       (2009.01)
    *H04W 76/27*       (2018.01)

(52) U.S. Cl.
    CPC ....... *H04L 27/2613* (2013.01); *H04W 56/001* (2013.01); *H04W 76/27* (2018.02)

(56)          References Cited

U.S. PATENT DOCUMENTS

| | | | | |
|---|---|---|---|---|
| 2017/0331577 | A1 | 11/2017 | Parkvall et al. | |
| 2019/0058517 | A1* | 2/2019 | Kang | H04B 7/0626 |
| 2019/0081759 | A1* | 3/2019 | Wang | H04L 5/0091 |
| 2019/0141693 | A1* | 5/2019 | Guo | H04W 72/042 |
| 2019/0379431 | A1* | 12/2019 | Park | H04L 27/2613 |
| 2020/0092737 | A1* | 3/2020 | Siomina | H04W 24/10 |
| 2020/0205116 | A1* | 6/2020 | Zhang | H04L 1/203 |
| 2020/0267571 | A1* | 8/2020 | Park | H04W 72/046 |
| 2020/0280409 | A1* | 9/2020 | Grant | H04L 5/0044 |
| 2020/0287678 | A1* | 9/2020 | Li | H04L 5/0048 |
| 2020/0336264 | A1* | 10/2020 | Faxer | H04B 7/0617 |

OTHER PUBLICATIONS

International Search Report and Written Opinion received for corresponding Patent Cooperation Treaty Application No. PCT/IB2018/058722, dated Jan. 25, 2019, 13 pages.
"Summary of QCL", 3GPP TSG-RAN WG1 Meeting #90bis, R1-1718863, Agenda: 7.2.3.7, Nokia, Oct. 9-13, 2017, 21 pages.
Notification of the First Office Action dated Nov. 17, 2021 corresponding to Chinese Patent Application No. 2018800868025, with English summary thereof.

ZTE et al., "Remaining details on TRS," 3GPP Draft; R1-1715452, 3GPP TSG RAN WG1 Meeting NR#3, Nagoya, Japan, Sep. 12, 2017.
Communication pursuant to Article 94(3) EPC dated May 12, 2022 corresponding to European Patent Application No. 18808114.5.
Notice of Reasons for Refusal dated Nov. 2, 2021 corresponding to Japanese Patent Application No. 2020-526485, and English translation thereof.
LG Electronics, "Discussion on fine time/frequency tracking of channel," 3GPP Draft; R1-1717949, 3GPP TSG RAN WG1 Meeting 90bis, Prague, Czech Republic, Oct. 3, 2017.
Huawei et al., "Reference signal for fine time and frequency tracking," 3GPP Draft; R1-1717308, 3GPP TSG RAN WG1 Meeting #90bis, Prague, Czech Republic, Oct. 2, 2017.
ZTE et al., "Remaining details on TRS," 3GPP Draft; R1-1717436, 3GPP TSG RAN WG1 Meeting 90bis, Prague, Czech Republic, Oct. 3, 2017.
Nokia et al., "Remaining details of TRS Design," 3GPP Draft; R1-1718519, 3GPP TSG-RAN WG1 #90bis, Prague, Czech Republic, Oct. 2, 2017.
Samsung, "Remaining details on TRS," 3GPP Draft; R1-1717633, 3GPP TSG RAN WG1 meeting 90bis, Prague, Czech Republic, Oct. 2, 2017.
Intel Corporation, "Remaining Details on TRS," 3GPP Draft; R1-1717376, 3GPP TSG RAN WG1 Meeting 90bis, Prague, Czech Republic, Oct. 3, 2017.
Notice of Preliminary Rejection dated Dec. 8, 2021 corresponding to Korean Patent Application No. 2020-7017245, with English Summary.
ZTE, "QCL design for UL and DL MIMO," R1-1717437, 3GPP TSG RAN WG1 Meeting #90bis, Prague, CZ, Oct. 3, 2017.
3GPP TS 38.214 V1.1.1 (Oct. 2017), Technical Specification, 3rd Generation Partnership Project; Technical Specification Group Radio Access Network; NR; Physical layer procedures for data (Release 15), Nov. 14, 2017.
Decision of Rejection dated Jun. 9, 2022 corresponding to Japanese Patent Application No. 2020-526485, with English translation thereof.
Notice of Final Rejection dated Jun. 21, 2022 corresponding to Korean Patent Application No. 2020-7017245, with English Summary thereof.
Notice of Final Rejection (post-RCE) dated Oct. 6, 2022 corresponding to Korean Patent Application No. 2020-7017245, with English summary thereof.
European Communication pursuant to Article 94(3) EPC, corresponding to EP Application No. 18 808 114.5, dated Sep. 30, 2025.

* cited by examiner

METHODS AND APPARATUSES FOR TIME AND FREQUENCY TRACKING REFERENCE SIGNAL USE IN NEW RADIO

RELATED APPLICATION

This application was originally filed as Patent Cooperation Treaty Application No. PCT/IB2018/058722 filed Nov. 6, 2018, which claims priority to a U.S. Provisional Application No. 62/587,706, filed on Nov. 17, 2017.

BACKGROUND

Field

Embodiments of the invention generally relate to wireless or cellular communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or 5G radio access technology or new radio (NR) access technology. Some embodiments may generally relate, for example, to 3GPP NR physical layer design, such as multiplexing a tracking reference signal (TRS) configured for a user equipment (UE) with other downlink signals.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (Evolved-UTRAN), the air interface design, protocol architecture and multiple-access principles are new compared to that of UTRAN, and no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity (DC).

Long Term Evolution (LTE) or E-UTRAN improved efficiency and services, offers lower costs, and provides new spectrum opportunities, compared to the earlier generations. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD). Carrier aggregation or said dual connectivity further allows operating on multiple component carriers at the same time hence multiplying the performance such as data rates per user.

As mentioned above, LTE may also improve spectral efficiency in networks, allowing carriers to provide more data and voice services over a given bandwidth. Therefore, LTE is designed to fulfill the needs for high-speed data and media transport in addition to high capacity voice support. Advantages of LTE include, for example, high throughput, low latency, FDD and TDD support in the same platform, an improved end-user experience, and a simple architecture resulting in low operating costs.

Certain further releases of 3GPP LTE (e.g., LTE Rel-10, LTE Rel-11) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers. The next releases of 3GPP LTE (e.g. LTE Rel-12, LTE Rel-13, LTE Rel-14, LTE Rel-15) are targeted for further improvements of specialized services, shorter latency and meeting requirements approaching the 5G.

$5^{th}$ generation (5G) or new radio (NR) wireless systems refer to the next generation (NG) of radio systems and network architecture. 5G is also known to appear as the IMT-2020 system. It is estimated that 5G will provide bitrates on the order of 10-20 Gbit/s or higher. 5G will support at least enhanced mobile broadband (eMBB) and ultra-reliable low-latency-communication (URLLC). 5G is also expected to increase network expandability up to hundreds of thousands of connections. The signal technology of 5G is anticipated for greater coverage as well as spectral and signaling efficiency. 5G is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. In 5G or NR, the Node B or eNB may be referred to as a next generation or 5G Node B (gNB).

SUMMARY

One embodiment is directed to a method, which may include defining an information element as a part of a channel state information reference signal (CSI-RS) resource set definition to indicate, to a user equipment, the channel state information reference signal (CSI-RS) resource(s) or synchronization signal block (SSB) resources used for tracking reference signal (TRS) purposes. The method may also include transmitting the information element to the user equipment to make it aware of the channel state information reference signal (CSI-RS) resources within one or more channel state information reference signal (CSI-RS) resource sets targeted for tracking reference signal (TRS) specific operation.

Another embodiment is directed to an apparatus, which may include at least one processor and at least one memory comprising computer program code. The at least one memory and computer program code configured, with the at least one processor, to cause the apparatus at least to define an information element as a part of a channel state information reference signal (CSI-RS) resource set definition to indicate, to a user equipment, the channel state information reference signal (CSI-RS) resource(s) or synchronization signal block (SSB) resources used for tracking reference signal (TRS) purposes, and to transmit the information element to the user equipment to make it aware of the channel state information reference signal (CSI-RS) resources within one or more channel state information reference signal (CSI-RS) resource sets targeted for tracking reference signal (TRS) specific operation.

In an embodiment, the defining step may include configuring a periodic channel state information reference signal (CSI-RS) resource in one of the channel state information reference signal (CSI-RS) resource sets and configuring an aperiodic channel state information reference signal (CSI-RS) resource in another one of the channel state information reference signal (CSI-RS) resource sets.

In certain embodiments, the defining step may include defining a tracking reference signal (TRS) information parameter via RRC signaling.

In some embodiments, the tracking reference signal (TRS) information parameter comprises a first element including a boolean value information element associated with the channel state information reference signal (CSI-RS) resource for tracking reference signal (TRS) purposes, a second element including a channel state information reference signal (CSI-RS) resource channel state information set identifier or synchronization signal block (SSB) resource indicator, and a third element including channel state information reference signal (CSI-RS) resource identifier(s) associated with channel state information reference signal (CSI-RS) or synchronization signal block resource.

In certain embodiments, the method may further include defining different combinations of channel state information reference signal (CSI-RS) resource set(s) or resource(s), with or without synchronization signal block (SSB) resources, to be used as transmission formats for fine time-frequency tracking reference signal (TRS), and configuring the user equipment with the different combinations channel state information reference signal (CSI-RS) resource set(s) or resource(s) for use as transmission formats.

Another embodiment is directed to an apparatus, which may include defining means for defining an information element as a part of a channel state information reference signal (CSI-RS) resource set definition to indicate, to a user equipment, the channel state information reference signal (CSI-RS) resource(s) or synchronization signal block (SSB) resources used for tracking reference signal (TRS) purposes. The apparatus may further include transmitting means for transmitting the information element to the user equipment to make it aware of the channel state information reference signal (CSI-RS) resources within one or more channel state information reference signal (CSI-RS) resource sets targeted for tracking reference signal (TRS) specific operation.

Another embodiment is directed to a method, which may include receiving an indication, from a network as a part of channel state information reference signal (CSI-RS) resource or resource set definition, of at least one of different channel state information reference signal (CSI-RS) resources or synchronization signal block (SSB) resources used for tracking reference signal (TRS) purposes.

Another embodiment is directed to an apparatus, which may include at least one processor and at least one memory comprising computer program code. The at least one memory and computer program code configured, with the at least one processor, to cause the apparatus at least to receive an indication, from a network as a part of channel state information reference signal (CSI-RS) resource or resource set definition, of at least one of different channel state information reference signal (CSI-RS) resources or synchronization signal block (SSB) resources used for tracking reference signal (TRS) purposes.

In certain embodiments, the receiving of the indication comprises receiving a tracking reference signal (TRS) information parameter that defines one or more information elements.

In some embodiments, a periodic channel state information reference signal (CSI-RS) resource is included in one of the channel state information reference signal (CSI-RS) resource sets and an aperiodic channel state information reference signal (CSI-RS) resource is included in another one of the channel state information reference signal (CSI-RS) resource sets.

In certain embodiments, the tracking reference signal (TRS) information parameter comprises a first element including a boolean value information element associated with the channel state information reference signal (CSI-RS) resource for tracking reference signal (TRS) purposes, a second element including a channel state information reference signal (CSI-RS) resource channel state information set identifier or synchronization signal block (SSB) resource indicator, and a third element including channel state information reference signal (CSI-RS) resource identifier(s) associated with channel state information reference signal (CSI-RS) or synchronization signal block resource.

Another embodiment is directed to an apparatus that may include receiving means for receiving an indication, from a network as a part of channel state information reference signal (CSI-RS) resource or resource set definition, of at least one of different channel state information reference signal (CSI-RS) resources or synchronization signal block (SSB) resources used for tracking reference signal (TRS) purposes.

BRIEF DESCRIPTION OF THE DRAWINGS

For proper understanding of the invention, reference should be made to the accompanying drawings, wherein.

DETAILED DESCRIPTION

Figure 1:
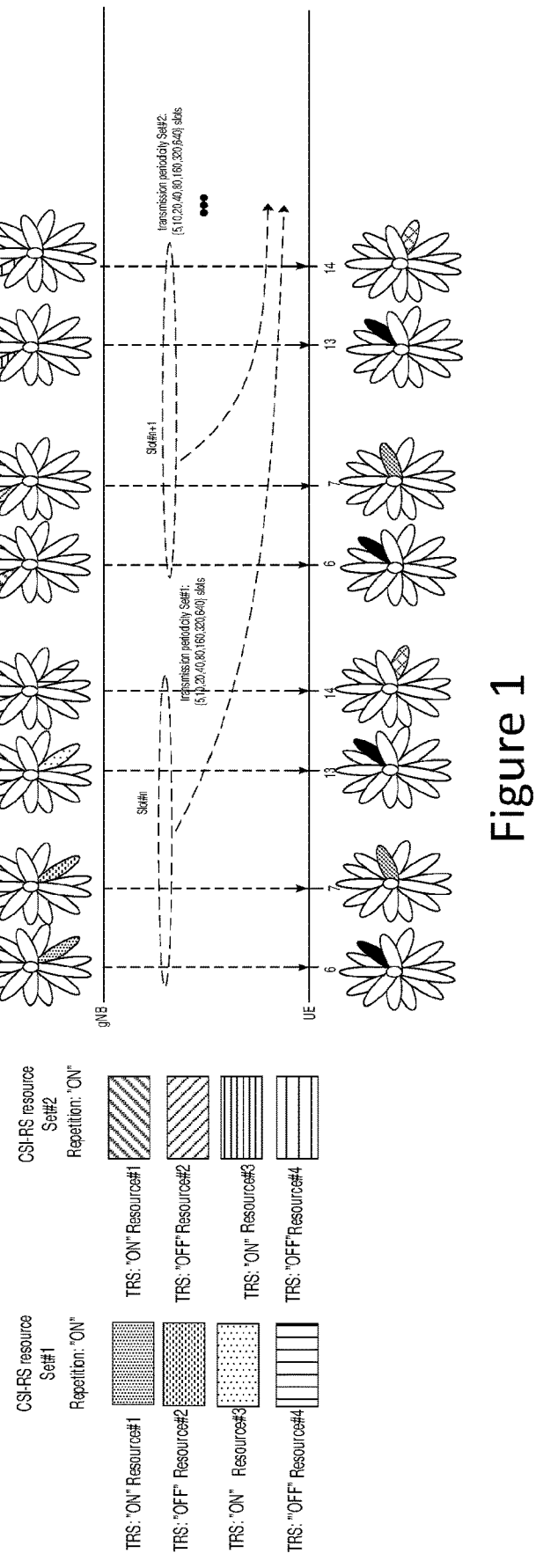
FIG. 1 illustrates an example diagram of the utilization of periodically transmitted downlink P1 beam management CSI-RS resources for TRS functionality, according to an embodiment.

It will be readily understood that the components of the invention, as generally described and illustrated in the figures herein, may be arranged and designed in a wide variety of different configurations. Thus, the following detailed description of the embodiments of systems, methods, apparatuses, and computer program products relating to usage of tracking reference signal (TRS) for fine time and frequency synchronization tracking in new radio (NR), as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles, teachings and embodiments of this invention, and not in limitation thereof.

Some embodiments relate to 3GPP New Radio (NR) physical layer design, for example, in 3GPP Rel-15 and onwards. For instance, an embodiment may be directed to multiplexing a tracking reference signal (TRS) configured for a UE with other downlink signals. TRS is configured for a UE in order to enable the UE to perform fine time and frequency synchronization tracking in a serving cell. Furthermore, the TRS may enable a UE to perform the parameter optimization for a channel estimator, e.g., the length of 2-D Wiener filter over frequency and time.

In certain embodiments, TRS may be configured as one-port channel state information reference signal (CSI-RS) resource(s) with the following parameters: TRS burst length is 2 consecutive slots; two TRS symbols in each TRS slot; TRS symbols may have the same symbol positions according to one of several options (e.g., configured by RRC)—in option 1 positions may be symbol 4 and 8 (symbol index starts from 0), in option 2 positions may be symbol 5 and 9, and in option 3 positions may be symbol 6 and 10; TRS bandwidth may be defined as the minimum of UE's bandwidth part (BWP) on which TRS is configured and 50 physical resource blocks (PRBs) (i.e., min(BWP, ~50 PRBs)); and TRS burst may be configured with different periodicities, such as 10, 20, 40 and 80 ms.

Based on the above text, it is expected that one or two different TRS burst configurations with fixed different symbol locations will be supported. However, due to problem of relatively fixed configuration, it is also likely that the reference signal overhead would increase.

In view of the above, in order to avoid extensive signaling overhead associated with different reference signals in a NR system, the multiplexing of different reference signals and/or signals/channels should be enhanced. To enable support for this, certain embodiments provide enhanced flexibility in terms of configuration signaling for the use of CSI-RS resources.

More specifically, one embodiment provides a flexible fine time-frequency TRS resource configuration method for fine frequency and time offset tracking and Doppler spread/shift and delay spread estimation at UE-side. Certain embodiments provide enhancements to existing radio resource control (RRC) signaling based CSI-RS configuration framework to indicate to UE on CSI-RS resources that are dedicated or intended to support TRS functionality at the UE-side. Furthermore, an embodiment enables the joint utilization of different reference signal type resources for TRS purposes at the UE-side. As a result of an embodiment of the resource configuration method, reference signal overheads related to TRS can be reduced. Particularly, due to more extensive usage of beam domain operations above 6 GHz, significant reference signal overhead reductions are provided by embodiments described herein.

In one embodiment, an information element may be defined as a part of CSI-RS resource or resource set definition and that information element may indicate, to a UE, the CSI-RS resource(s) to be used for TRS purposes. For example, according to an embodiment, the network may configure, e.g., via RRC signaling, a TRS information parameter, referred later in the text as TRS_INFO, that defines one or more of the following information elements: {element 1, element 2, element 3}. In an embodiment, element 1 may be defined as a boolean value information element associated with the CSI-RS resource, i.e, TRS purposes to {'ON/OFF'}, element 2 may be defined as a CSI-RS resource CSI-set ID or synchronization signal block (SSB) index or resource indicator being used with this specific resource set/resource, and element 3 may be defined as CSI-RS resources ID(s) or resource indicator associated with CSI-RS or SS-block resource that are used with this specific resource ID or resource set ID. It may be implicitly assumed that antenna port (AP) and resource element configuration between source resource set/resource and targeted resource(s)/resource set(s) and resource(s) therein are aligned with each other. According to one embodiment, based on information elements associated with CSI-RS set(s) or CSI-RS resource(s) on TRS functionality, the UE is aware of CSI-RS resources within a CSI-RS resource set targeted for TRS specific operation, as well as knowledge of how these resources are linked to other TRS specific resources within different CSI-RS resource sets or SSB indices or SSB resources. In an embodiment, to enable the joint use of multiple different reference signals and/or signals for TRS functionalities with reduced signaling overhead, different combinations of CSI-RS resource set(s) and resource(s) with or without SSB resources may be defined to be used as transmission formats for fine time-frequency TRS. For example, according to certain embodiments, the transmission formats that may be used for fine time-frequency TRS may include format 0, format 1, format 2, and format 3.

Format 0 may include joint use of periodically/semi-persistently/aperiodically configured DL beam management (BM) procedures for the identification of resource indicators associated with CSI-RS resources and/or SSB resources that are filtered in spatial domain at the base station and/or UE side, which are referred to as procedure one (P1) or procedure two (P2). Alternatively, format 0 can also be used in the context of spatial domain filter alignment either at both the base station and UE sides or either of them, which is referred to as procedure three (P3). For single or multiple CSI-RS resource sets targeted for DL BM P1-P3 procedures, higher layer parameter CSI-RS-ResourceRep may be set as 'ON/OFF'. For TRS resources within CSI-RS resource set, TRS_INFO may be set to {'ON',-,other resource IDs within the set}. Here, the sign "-" means that no value is defined for this element. The same one-antenna port resource element pattern may be used with resources for TRS purposes.

Format 1 may include joint use of periodically/semi-persistently configured DL beam management P1/P2 CSI-RS resources and first additional periodically/semi-persistently configured 1-antenna port CSI-RS resources. For single or multiple CSI-RS resource sets targeted for DL BM P1-P2 procedures, higher layer parameter CSI-RS-ResourceRep may be set as 'ON/OFF'. For TRS resources within CSI-RS resource set for DL BM P1-P2 as well for the first additional 1-set of aperiodic (AP) CSI-RS resources, TRS_INFO may be set to {'ON', Resource set IDs (same/different), resource IDs within sets}. The same one-antenna port resource element pattern may be used with resources for TRS purposes. The CSI-RS resources assigned for DL beam management P1-P3 procedures and separate 1-antenna port CSI-RS resources are configured to be located into multiple N1 consecutive time slots, where N1 assigned can be fixed or configurable by the network, such that CSI-RS resources of P1-P3 are in slot n and 1-antenna port CSI-RS resources in consecutive n+N1 slot(s). This assumes that the configured time periodicity of both resources is the same.

Format 2 may include joint use of periodically/semi-persistently configured DL beam management P1 and/or P2 CSI-RS resources and first additional periodically/semi-persistently configured 1-antenna port CSI-RS resources and second additional periodically/semi-persistently configured 1-antenna port CSI-RS resources. For single or multiple CSI-RS resource sets targeted for DL BM P1-P2 procedures, higher layer parameter CSI-RS-ResourceRep may be set to 'ON/OFF'. For TRS resources within CSI-RS resource set for DL BM P1-P2 and for first and second additional CSI-RS resources, TRS_INFO may be set to {'ON',Resource set IDs (same/different), resource IDs within sets}. The time periodicities of DL BM P1-P2 CSI-RS resources and first additional 1-set of aperiodic (AP) CSI-RS resources are configured to be same or different. The time periodicity of the second additional CSI-RS can be the same or different with respect to that of DL BM P1-P2 CSI-RS resources. The same one-antenna port resource element pattern may be used with resources for TRS purposes. The CSI-RS resources assigned for DL beam management P1-P3 procedures and first additional 1-antenna port CSI-RS resources may be configured to be located into single/multiple N1 consecutive time slot(s), where N1 assigned can be fixed or configurable by network, such that CSI-RS resources of P1-P3 are in slot n and 1-antenna port CSI-RS resources in consecutive n+N1 slot(s). The second additional CSI-RS resource are configured to be located into single/multiple N2 consecutive time slot(s), where N2 assigned can be fixed or configurable by the network.

Format 3 may include joint use of periodically transmitted SSB resources and/or P2 CSI-RS resources and first additional periodically/semi-persistently configured 1-antenna port CSI-RS resources and/or second additional periodically/semi-persistently configured 1-antenna port CSI-RS resources. For TRS resources for the first additional CSI-RS resources, TRS_INFO may be set to {'ON', SSB time index/resource index, -}, where the sign "-" means that no value is defined for this element. Based on the given SSB index/resource indicator, UE can be implicitly aware of the time-frequency location of DMRS resources within SSB. The time periodicities of first additional 1 AP CSI-RS resources are configured to be same as the periodicity of SSB. The time periodicity of the second additional CSI-RS can be the same or different with respect to that of the first additional 1-AP CSI-RS resources. The same one-antenna port resource element pattern may be used with resources for TRS purposes. The first additional 1-antenna port CSI-RS resources may be configured to be located into single/multiple N1 consecutive time slot(s) after a given SSB index, where N1 assigned can be fixed or configurable by the network, such that SSB resources are in slot n and 1-antenna port CSI-RS resources in consecutive n+N1 slot(s). The second additional CSI-RS resource may be configured to be located into single/multiple N2 consecutive time slot(s), where N2 assigned can be fixed or configurable by the network.

FIG. 1 illustrates an example diagram of the utilization of periodically transmitted downlink (DL) P1 beam management CSI-RS resources for TRS functionality, according to an embodiment. As illustrated in the example of FIG. 1, two separate CSI-RS resource sets may be user-specifically configured by RRC, namely, CSI-RS set 1 and CSI-RS set 2. Furthermore, each CSI-RS resource set may be configured, for example, with four separate resources. Moreover, it may be assumed that each resource is mapped to single or multiple antenna ports associated with CSI-RS. The network may configure DL P1/P2 beam management functionality by higher layer parameter, CSI-RS-ResourceRep to be 'ON'. As a result of this, the transmitter (Tx) beam direction/spatial domain filter of gNB is kept fixed over the resources that are time-division-multiplexed with each other within the resource set. The number of resources within a CSI-RS set defines the number of repeated Tx beams/spatial domain direction in time. By RRC-signaling, the NR higher layer parameter, ResourceConfigType, associated with resource sets may be configured to be periodic. The time periodicity of both sets may be configured by higher layer parameter, CSI-RS-timeConfig, e.g., {5, 10, 20, 40, 60, 80, 160, 320, 640}, in time/slot units. To enable a UE to leverage configured CSI-RS resources also for TRS purposes, according to an embodiment, the higher layer configured information element as a part of CSI-RS resource definition is introduced. The higher layer configured TRS_INFO parameter with 'ON/OFF' value indicates, for the UE, whether CSI-RS resource shall be used for the computation of TRS purposes. Furthermore, this information element may also include set ID(s)/SSB index and CSI-RS resource ID(s)/SSB resources to inform the UE about resource(s) or set(s), based on which UE shall compute TRS related estimates. For resources 1 and 3 within the resource set 1, TRS_INFO may be set to {'ON',-,3} and {'ON',-,1}, respectively. For resources 1 and 3 within the resource set 2, TRS_INFO may be set to {'ON',-,3} and {'ON',-,1}, respectively. Furthermore, in both sets 1 and 2, resources 1 and 3 may be spatially quasi-colocated (QCL):ed with each other. Again, the same QCL association may be applied for the CSI-RS set 2. The resource element configuration for each resource may be configured as 1-antenna port configuration with a specific resource element density per physical resource block, e.g., 1, 3, 4, 6.

As a result of the above-described configuration depicted in the example of FIG. 1, residual time-frequency offset estimation and Doppler can be performed as a part of DL P1 beam management at the UE side. To enable this, one symbol TX beam/spatial domain filter scheduling restriction for P1 in each measurement may be introduced. In addition, the TRS transmission periodicity in time needs to be aligned with the time periodicity of DL BM CSI-RS. Furthermore, the width of fine frequency offset estimation window is limited by the supported CSI-RS symbol locations in NR. Despite these limitations, the proposal enables to significantly reduce signaling overhead compared to the transmission of separate X=2 based TRS transmission. It is noted that the use of aperiodic CSI-RS resources for P3 DL beam is a special case of P1/P3 configuration with CSI-RS-ResourceRep set to 'ON'.

Figure 2:
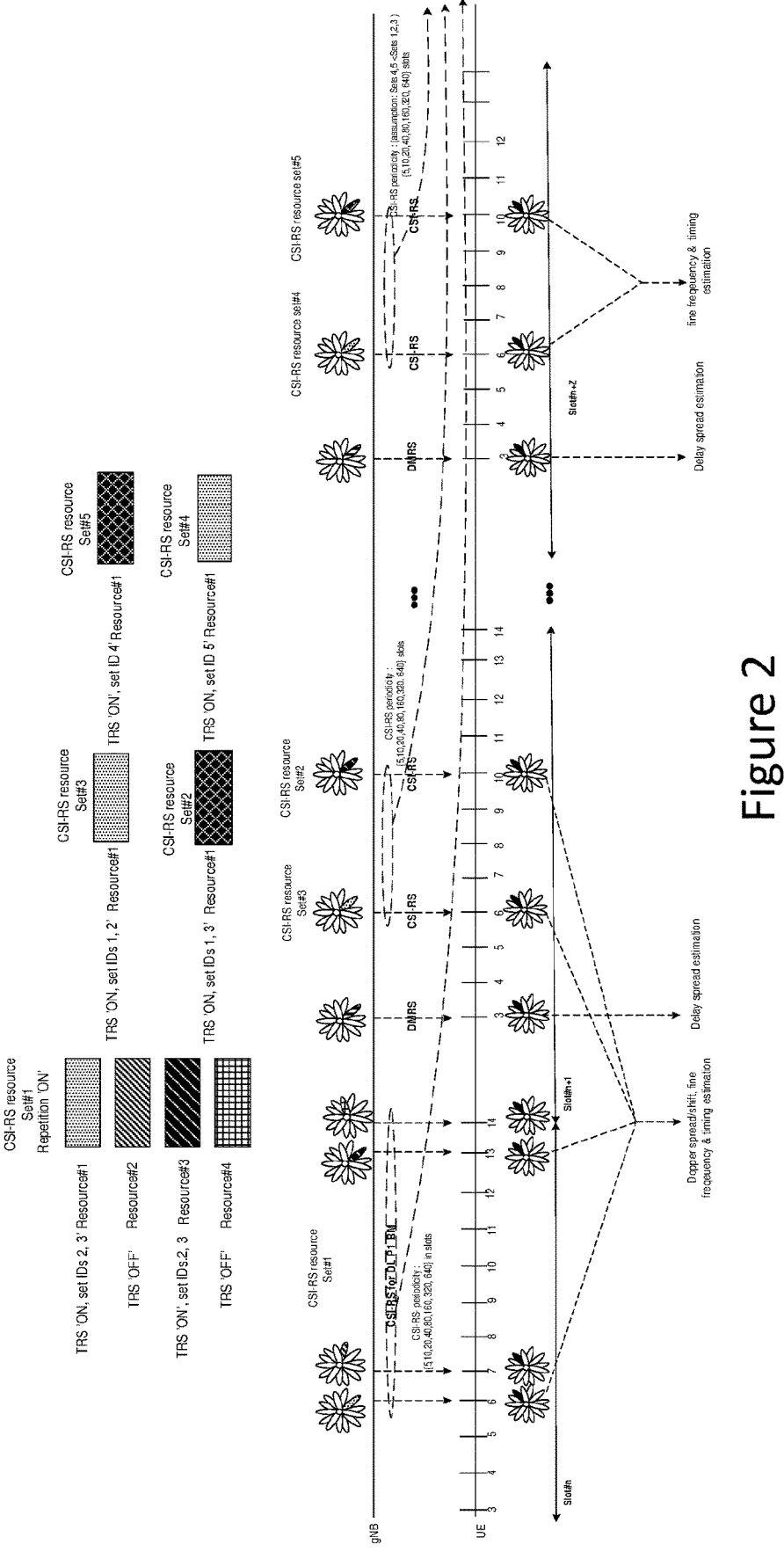
FIG. 2 illustrates an example diagram of the utilization of periodically transmitted downlink P1 beam management CSI-RS and separately configured resources for 1-set of aperiodic (AP) CSI-RS resources for TRS functionality, according to an embodiment.

FIG. 2 illustrates an example diagram of the utilization of periodically transmitted downlink P1 beam management CSI-RS (CSI-RS set 1) and separately configured resources for 1 AP CSI-RS resources (CSI-RS sets 2,3) as well as separately configured resources for 1 AP CSI-RS resources (CSI-RS sets 4,5) for TRS functionality, according to an embodiment. In the example of FIG. 2, all CSI-RS resource sets with resources therein have been user-specifically configured by RRC, namely, CSI-RS sets 1-5. Moreover, it may be assumed that each resource is mapped to single or multiple antenna ports associated with CSI-RS. By RRC-signaling, the NR higher layer parameter, ResourceConfig-Type, associated with resource sets may be configured to be periodic. The time periodicity of both set 2 and 3 may be configured by higher layer parameter, CSI-RS-timeConfig, e.g., {5, 10, 20, 40, 60, 80, 160, 320, 640}, to be the same as with the CSI-RS set 1 in time/slot units. The time periodicity of CSI-RS sets 4 and 5 may be configured to be shorter in time with respect to set 1, 2, and 3. Here, TRS_INFO may be set to {ON, {2, 3},-} for resources 1 and 3 in CSI-RS resource set 1. For resource set 2, the TRS_info parameter may be set to {ON, sets {1,3},-} and, for set 3, to {ON, sets {1,2},-}. Furthermore, resources 1 and 3 may be spatially QCL:ed with each other in resource set 1. Moreover, the resource 1 in both sets 2 and 3, may be spatially QCL:ed with resources 1 and 3 within the resource set 1. Additionally, resource 1 in both sets 4 and 5 may be QCL:ed with each other. The resource element configuration for each resource may be configured as 1-antenna port configuration with a specific resource element density per physical resource block, e.g., 1, 2, 3, 4, 6.

As a result of the above-described configuration depicted in the example of FIG. 2, residual time-frequency offset estimation and Doppler spread/shift estimation can be performed based on P1 BM CSI-RS resources, i.e., set 1 and separately configured resources, i.e., set 2 and 3 at the UE side. Additionally, instead of performing delay spread estimation on CSI-RS resource, delay spread estimation at the UE-side can be performed based DMRS resource elements associated with physical shared data channel transmission (PDSCH). DMRS based delay spread estimation is more accurate with respect to TRS based one. Moreover, the time periodicity of CSI-RS sets 4, 5 may be configured to be shorter with respect to the CSI-RS sets 1 and 2. As a result of this, enhanced time and frequency offset tracking as well as Doppler spread/shift estimation can be enabled with reduced reference signal overhead.

Figure 3:
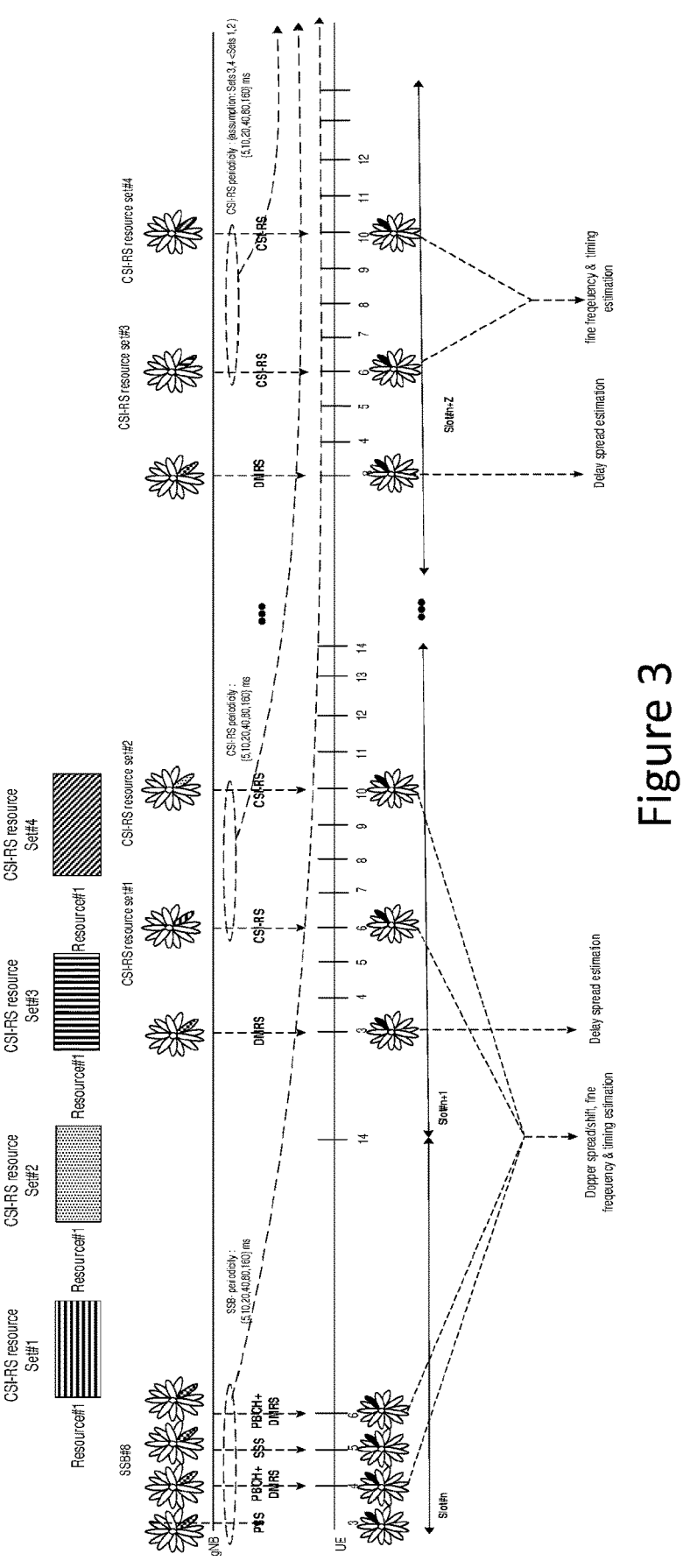
FIG. 3 illustrates an example diagram of the exploitation of periodically transmitted SSB and separately configured resources for 1 AP CSI-RS resources, as well as separately configured resources for 1 AP CSI-RS resources for TRS functionality, according to an embodiment.

FIG. 3 illustrates an example diagram of the exploitation of periodically transmitted SSB and separately configured resources for 1 AP CSI-RS resources (CSI-RS sets 1,2), as well as separately configured resources for 1 AP CSI-RS resources (CSI-RS sets 3,4) for TRS functionality, according to an embodiment. In the example of FIG. 3, all CSI-RS resource sets with resources therein have been user-specifically configured by RRC, namely, CSI-RS sets 1-4. Moreover, it may be assumed that each resource is mapped to single or multiple antenna ports associated with CSI-RS. By RRC-signaling, the NR higher layer parameter, ResourceConfigType, associated with CSI resource sets 1, 2, 3, and 4 may be configured to be periodic. The time periodicity of set 1 may be configured by higher layer parameter, CSI-RS-timeConfig, to be aligned with the time periodicity of SSB. Here, TRS_INFO is set to {ON, SSB 8,-} for resources 1 in both CSI-RS resource sets 1 and 2. Furthermore, CSI-RS resources of set 1 and 2 may be spatially QCL:ed with DMRS resources associated with PBCH with SSB. Additionally, resources 1 and 1 may be spatially QCL:ed with each other over resource sets 1 and 2. Moreover, the resource 1 in both sets 2 and 3, may be spatially QCL:ed with each other. Additionally, resource 1 in both sets 3 and 4 may be QCL:ed with each other. The resource element configuration for each resource may be configured as 1-antenna port configuration with a specific resource element density per physical resource block, e.g., 1, 2, 3, 4, 6.

As a result of the above-described configuration depicted in FIG. 3, residual time-frequency offset estimation and Doppler spread/shift estimation can be performed based on SSB-resources and CSI-RS sets 1 and 2 at the UE side. Additionally, instead of performing delay spread estimation on CSI-RS resource, delay spread estimation at the UE-side may be performed based on DMRS resource elements associated with physical shared data channel transmission (PDSCH). Moreover, the time periodicity of CSI-RS sets 3, 4 is configured to be shorter with respect to the CSI-RS sets 1 and 2. As a result of this, enhanced time and frequency offset tracking as well as Doppler spread/shift estimation can be achieved with reduced reference signal overhead.

Figure 4:
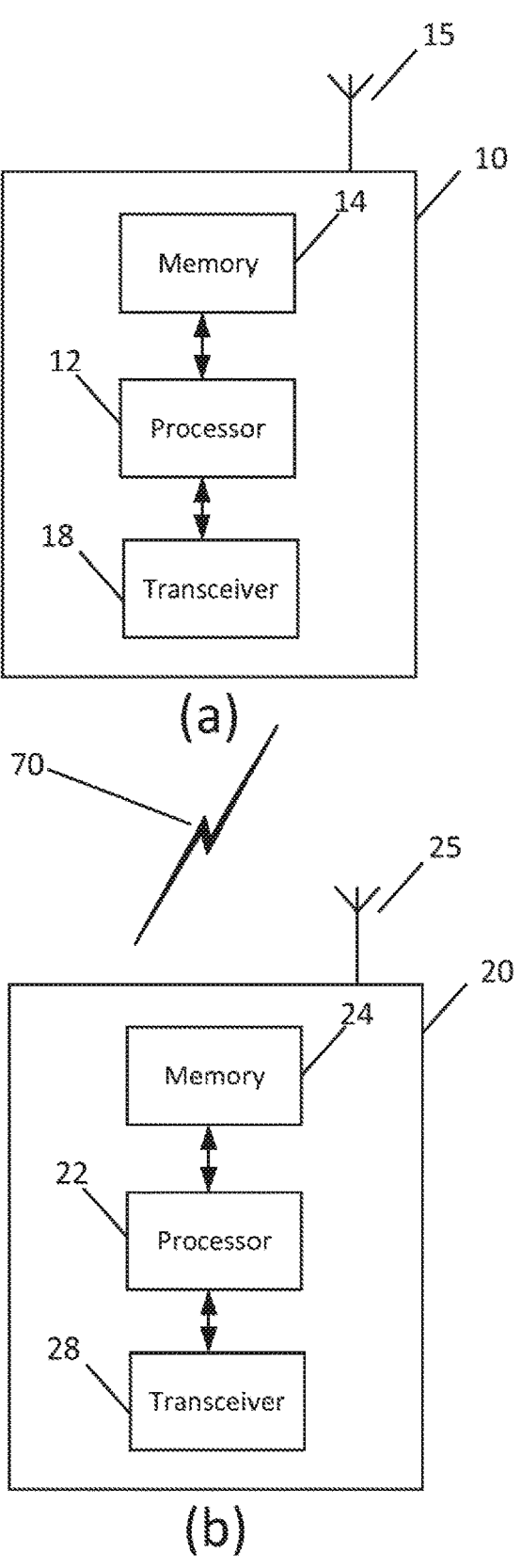
FIG. 4a illustrates a block diagram of an apparatus, according to one embodiment.
FIG. 4b illustrates a block diagram of an apparatus, according to another embodiment.

FIG. 4a illustrates an example of an apparatus 10 according to an embodiment. In an embodiment, apparatus 10 may be a node, host, or server in a communications network serving such a network. For example, apparatus 10 may be a base station, a Node B, an evolved Node B (eNB), 5G Node B or access point, next generation Node B (NG-NB or gNB), WLAN access point, mobility management entity (MME), or subscription server associated with a radio access network, such as a GSM network, LTE network, 5G or NR.

It should be understood that apparatus 10 may be comprised of an edge cloud server as a distributed computing system where the server and the radio node may be standalone apparatuses communicating with each other via a radio path or via a wired connection, or they may be located in a same entity communicating via a wired connection. It should be noted that one of ordinary skill in the art would understand that apparatus 10 may include components or features not shown in FIG. 4a.

As illustrated in FIG. 4a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FP-GAs), application-specific integrated circuits (ASICs), and processors based on a multi-core processor architecture, as examples. While a single processor 12 is shown in FIG. 4a, multiple processors may be utilized according to other embodiments. For example, it should be understood that, in certain embodiments, apparatus 10 may include two or more processors that may form a multiprocessor system (i.e., in this case processor 12 represents a multiprocessor) that may support multiprocessing. In certain embodiments, the multiprocessor system may be tightly coupled or loosely coupled (e.g., to form a computer cluster).

Processor 12 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the embodiments described herein, such as the flow diagrams illustrated in FIGS. 1-3.

In an embodiment, apparatus 10 may be controlled by memory 14 and processor 12 to define an information element as a part of CSI-RS resource or resource set definition to indicate, to a UE, the CSI-RS resource to be used for TRS purposes. For example, according to one embodiment, apparatus 10 may be controlled by memory 14 and processor 12 to define a TRS information parameter, e.g., via RRC signaling, that defines one or more information elements. According to one embodiment, the TRS information parameter may include a first element that may include a boolean value information element associated with the CSI-RS resource for TRS purposes to {'ON/OFF'}, a second element that may include a CSI-RS resource CSI-set ID or synchronization signal block (SSB) index/resource indicator, and a third element that may include CSI-RS resources ID(s) or resource indicator associated with CSI-RS or SS-block resource that are used with this specific resource ID or resource set ID. It may be implicitly assumed that antenna port and resource element configuration between source resource set/resource are aligned with target resource set(s) and resource(s) therein.

According to one embodiment, apparatus 10 may then be controlled by memory 14 and processor 12 to transmit to a UE or configure a UE with the TRS information parameter, as defined above, so that the UE is made aware of the CSI-RS resources within a CSI-RS resource set targeted for TRS specific operation, as well as knowledge how these resources linked to other TRS specific resources within different CSI-RS resource set or SSB indices or SSB resources or SSB resource indicators.

In certain embodiments, to enable the joint use of multiple different reference signals and/or signals and/or SSB resources for TRS functionalities with reduced signaling overhead, apparatus 10 may also be controlled by memory 14 and processor 12 to define different combinations of CSI-RS resource set(s) and/or resource(s), with or without SSB resources, to be used as transmission formats for fine time-frequency TRS, and to transmit or configure the UE with the different combinations CSI-RS resource set(s) and/or resource(s) for use as transmission formats. According to an embodiment, the transmission formats may include Format 0, Format 1, Format 2, and/or Format 3, as discussed in detail above. For example, Format 0 may be for joint use of periodically/semi-persistently/aperiodically configured DL beam management (BM) P1-P3 and/or P2 CSI-RS resource set(s) and resource(s). Format 1 may be for joint use of periodically/semi-persistently configured DL beam management P1/P2 CSI-RS resources and first additional periodically/semi-persistently configured 1-antenna port CSI-RS resources. Format 2 may be for joint use of periodically/semi-persistently configured DL beam management P1 and/or P2 CSI-RS resources and first additional periodically/semi-persistently configured 1-antenna port CSI-RS resources and/or second additional periodically/semi-persistently configured 1-antenna port CSI-RS resources. Format 3 may be for joint use of periodically transmitted SSB resources and/or P2 CSI-RS resources and first additional periodically/semi-persistently configured 1-antenna port CSI-RS resources and/or second additional periodically/semi-persistently configured 1-antenna port CSI-RS resources.

FIG. 4b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, and the like), one or more radio access components (for example, a modem, a transceiver, and the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and any other radio access technologies. It should be noted that one of ordinary skill in the art would understand that apparatus 20 may include components or features not shown in FIG. 4b.

As illustrated in FIG. 4b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4b, multiple processors may be utilized according to other embodiments. For example, it should be understood that, in certain embodiments, apparatus 20 may include two or more processors that may form a multiprocessor system (i.e., in this case processor 22 represents a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 24 can be comprised of any combination of random access memory (RAM), read only memory (ROM), static storage such as a magnetic or optical disk, or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an embodiment, apparatus 20 may be configured to communicate with apparatus 10 via a wireless or wired communications link 70 according to any radio access technology, such as NR.

According to one embodiment, apparatus 20 may be a UE, mobile device, mobile station, ME, IoT device and/or NB-IoT device, for example. According to certain embodiments, apparatus 20 may be controlled by memory 24 and processor 22 to perform the functions associated with embodiments described herein. For example, in some embodiments, apparatus 20 may be configured to perform one or more of the processes depicted in any of the flow charts or signaling diagrams described herein, such as the flow diagrams illustrated in FIGS. 1-3.

According to one embodiment, apparatus 20 may be controlled by memory 24 and processor 22 to receive an indication, from the network as a part of CSI-RS resource or resource set definition, of the different CSI-RS resource(s) and/or SSB resources to be used for TRS purposes. For example, according to one embodiment, apparatus 20 may be controlled by memory 24 and processor 22 to receive a TRS information parameter, e.g., via RRC signaling, that defines one or more information elements. According to one embodiment, the TRS information parameter may include a first element that may include a boolean value information element associated with the CSI-RS resource for TRS purposes to {'ON/OFF'}, a second element that may include a CSI-RS resource CSI-set ID or synchronization signal block (SSB) index, and a third element that may include CSI-RS resources ID(s) or resource indicator associated with CSI-RS or SS-block resource that are used with this specific resource ID or resource set ID.

In an embodiment, based on the indication or TRS information parameter received from the network, apparatus 20 may be controlled by memory 24 and processor 22 to jointly utilize the different CSI-RS resource(s) and/or SSB resources for TRS purposes. According to certain embodiments, apparatus 20 may also be controlled by memory 24 and processor 22 to receive an indication of different combinations of CSI-RS resource set(s) and/or resource(s), with or without SSB resources, to be used as transmission formats for fine time-frequency TRS, and to transmit or configure the UE with the different combinations CSI-RS resource set(s) and/or resource(s) for use as transmission formats. According to an embodiment, the transmission formats may include Format 0, Format 1, Format 2, and/or Format 3, as discussed in detail above.

Figure 5A:
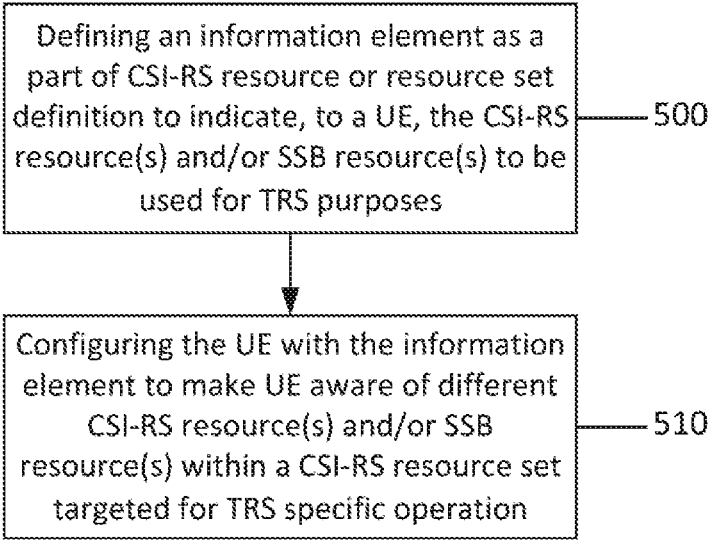
FIG. 5a illustrates an example flow diagram of a method, according to an embodiment.

FIG. 5a illustrates an example flow diagram of a method for flexible fine time-frequency TRS resource configuration, according to an example embodiment. In one embodiment, the method may be performed by a network node, such as a base station, eNB, gNB, relay node, or access node, for example. In an embodiment, the method of FIG. 5a may include, at 500, defining an information element as a part of CSI-RS resource or resource set definition to indicate, to a UE, the CSI-RS resource(s) and/or SSB resource(s) to be used for TRS purposes. For example, according to one embodiment, the defining 500 may include defining a TRS information parameter, e.g., via RRC signaling, that includes one or more information elements. According to one embodiment, the TRS information parameter may include a first element that may include a boolean value information element associated with the CSI-RS resource for TRS purposes to {'ON/OFF'}, a second element that may include a CSI-RS resource CSI-set ID or synchronization signal block (SSB) index/resource indicator, and a third element that may include CSI-RS resources ID(s) or resource indicator associated with CSI-RS or SS-block resource that are used with this specific resource ID or resource set ID.

According to one embodiment, the method may also include, at 510, transmitting to a UE and/or configuring the UE with the information element and/or TRS information parameter, as defined above, so that the UE is made aware of the CSI-RS resource(s) within a CSI-RS resource set and/or SSB resource(s) targeted for TRS specific operation, as well as knowledge how these resources linked to other TRS specific resources within different CSI-RS resource set or SSB indices or SSB resources.

In certain embodiments, to enable the joint use of multiple different reference signals and/or signals for TRS functionalities with reduced signaling overhead, the method may also include defining different combinations of CSI-RS resource set(s) and/or resource(s), with or without SSB resources, to be used as transmission formats for fine time-frequency TRS, and transmitting or configuring the UE with the different combinations CSI-RS resource set(s) and/or resource(s) for use as transmission formats. According to an embodiment, the transmission formats may include Format 0, Format 1, Format 2, and/or Format 3, as discussed in detail above.

Figure 5B:
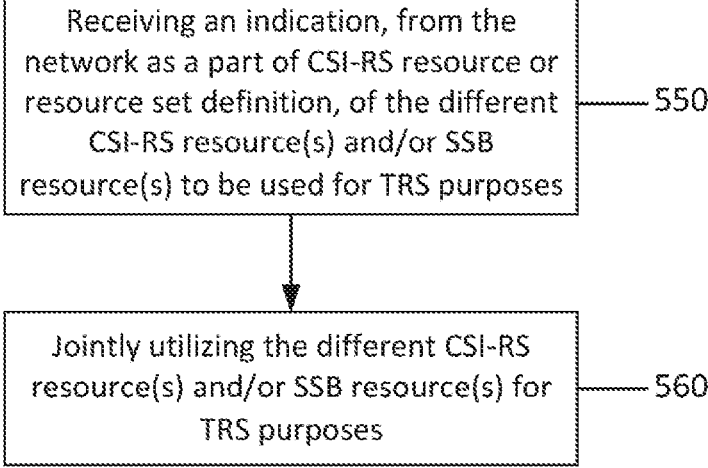
FIG. 5b illustrates an example flow diagram of a method, according to another embodiment

FIG. 5b illustrates an example flow diagram of a method for flexible fine time-frequency TRS resource configuration, according to an example embodiment. In one embodiment, the method of FIG. 5b may be performed by a UE or mobile station, for example. The method of FIG. 5b may include, at

550, receiving an indication, from the network as a part of CSI-RS resource or resource set definition, of the different CSI-RS resource(s) and/or SSB resource(s) to be used for TRS purposes. For example, according to one embodiment, the receiving 550 may include receiving a TRS information parameter, e.g., via RRC signaling, that defines one or more information elements. According to one embodiment, the TRS information parameter may include a first element that may include a boolean value information element associated with the CSI-RS resource for TRS purposes to {'ON/OFF'}, a second element that may include a CSI-RS resource CSI-set ID or synchronization signal block (SSB) index, and a third element that may include CSI-RS resources ID(s) or resource indicator associated with CSI-RS or SS-block resource that are used with this specific resource ID or resource set ID.

In an embodiment, based on the indication or TRS information parameter received from the network, the method may include, at 560, jointly utilizing the different CSI-RS resource(s) and/or SSB resource(s), as indicated by the network, for TRS purposes. According to certain embodiments, the method may further include receiving an indication of different combinations of CSI-RS resource set(s) and/or resource(s), with or without SSB resources, to be used as transmission formats for fine time-frequency TRS. According to an embodiment, the transmission formats may include Format 0, Format 1, Format 2, and/or Format 3, as discussed in detail above.

Therefore, embodiments of the invention provide several technical improvements, enhancements, and/or advantages. For example, as a result of certain embodiments, reduced frequency tracking reference signal transmission overhead can be obtained in different scenarios with and without the availability of a SS-block. For above 6 GHz communication, different CSI-RS based DL beam management procedures P1-P3 may be used. Therefore, reference signal overhead can be reduced by introducing linkage between different downlink CSI-RS based beam management configurations and one antenna port CSI-RS resource(s). Instead of using X=2, N=2+2, e.g. Sf=4, Sf=4, resource configuration, X=1 can be configured to be used in many scenarios leading to reduced reference signal transmission overhead. As such, embodiments of the invention can improve performance and throughput of network nodes including, for example, base stations/eNBs/gNBs and UEs. Accordingly, the use of embodiments of the invention result in improved functioning of communications networks and their nodes.

In some embodiments, the functionality of any of the methods, processes, signaling diagrams, or flow charts described herein may be implemented by software and/or computer program code or portions of code stored in memory or other computer readable or tangible media, and executed by a processor.

One embodiment is directed to a method that may include defining an information element as a part of CSI-RS resource or resource set definition to indicate, to a UE, the CSI-RS resource(s) and/or SSB resources to be used for TRS purposes. The method may also include transmitting the information element to the UE to make it aware of the CSI-RS resources within a CSI-RS resource set targeted for TRS specific operation.

Another embodiment is directed to an apparatus including at least one processor and at least one memory comprising computer program code. The at least one memory and computer program code configured, with the at least one processor, to cause the apparatus at least to define an information element as a part of CSI-RS resource or resource set definition to indicate, to a UE, the CSI-RS resource(s) to be used for TRS purposes. The at least one memory and computer program code may be further configured, with the at least one processor, to cause the apparatus at least to transmit the information element to the UE to make it aware of the CSI-RS resources within a CSI-RS resource set and/or SSB resources targeted for TRS specific operation.

Another embodiment is directed to a method that may include receiving an indication, from the network as a part of CSI-RS resource or resource set definition, of the different CSI-RS resource(s) to be used for TRS purposes. The method may also include, based on the indication or TRS information parameter received from the network, jointly utilizing the different CSI-RS resource(s) and/or SSB resources for TRS purposes.

Another embodiment is directed to an apparatus including at least one processor and at least one memory comprising computer program code. The at least one memory and computer program code configured, with the at least one processor, to cause the apparatus at least to receiving an indication, from the network as a part of CSI-RS resource or resource set definition, of the different CSI-RS resource(s) and/or SSB resources to be used for TRS purposes. The at least one memory and computer program code may also be configured, with the at least one processor, to cause the apparatus at least to, based on the indication or TRS information parameter received from the network, jointly utilizing the different CSI-RS resource(s) for TRS purposes.

In some embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
generating an information element as a part of a channel state information reference signal resource set definition via radio resource control signaling to indicate, to a user equipment, one or more tracking reference signal purposes for at least one of a channel state information reference signal resource defined in the channel state information reference signal resource set definition; and
transmitting the information element to the user equipment to make the user equipment aware of at least one channel state information reference signal resource within one or more channel state information reference signal resource sets targeted for the one or more tracking reference signal purposes, wherein the information element is a boolean value information element and when it is present and set to 'ON,' the at least one of the channel state information reference signal resource defined in the channel state information reference signal resource set definition is targeted for the one or more tracking reference signal purposes.

2. The method according to claim 1, wherein a periodic channel state information reference signal resource is included in one channel state information reference signal resource set of the one or more channel state information reference signal resource sets and an aperiodic channel state information reference signal resource is included in another one channel state information reference signal resource set of the one or more channel state information reference signal resource sets.

3. The method according to claim 1, wherein the generating comprises generating a tracking reference signal information parameter via the radio resource control signaling.

4. The method according to claim 3, wherein the tracking reference signal information parameter comprises at least one of a first element including the Boolean value information element associated with the at least one channel state information reference signal resource for tracking reference signal purposes, a second element including a channel state information reference signal resource channel state information set identifier or synchronization signal block resource indicator, or a third element including at least one channel state information reference signal resource identifier associated with the at least one channel state information reference signal or synchronization signal block resource.

5. The method according to claim 1, further comprising:

generating different combinations of channel state information reference signal resource sets or resources, with or without synchronization signal block resources, to be used as transmission formats for fine time-frequency tracking reference signal; and configuring the user equipment with the different combinations for use as the transmission formats.

6. An apparatus, comprising:

at least one processor; and at least one memory comprising computer program code, the at least one memory and computer program code configured, with the at least one processor, to cause the apparatus at least to generate an information element as a part of a channel state information reference signal resource set definition via radio resource control signaling to indicate, to a user equipment, one or more tracking reference signal purposes for at least one of a channel state information reference signal resource defined in the channel state information reference signal resource set definition; and transmit the information element to the user equipment to make the user equipment aware of at least one channel state information reference signal resource within one or more channel state information reference signal resource sets targeted for the one or more tracking reference signal purposes, wherein the information element is a boolean value information element and when it is present and set to 'ON,' the at least one of the channel state information reference signal resource defined in the channel state information reference signal resource set definition is targeted for the one or more tracking reference signal purposes.

7. The apparatus according to claim 6, wherein a periodic channel state information reference signal resource is included in one channel state information reference signal resource set of the one or more channel state information reference signal resource sets and an aperiodic channel state information reference signal resource is included in another one channel state information reference signal resource set of the one or more channel state information reference signal resource sets.

8. The apparatus according to claim 6, wherein when generating the information element, the at least one memory and computer program code are configured, with the at least one processor, to cause the apparatus at least to generate a tracking reference signal information parameter via the radio resource control signaling.

9. The apparatus according to claim 8, wherein the tracking reference signal information parameter comprises at least one of a first element including the Boolean value information element associated with the at least one channel state information reference signal resource for tracking reference signal purposes, a second element including a channel state information reference signal resource channel state information set identifier or synchronization signal block resource indicator, or a third element including at least one channel state information reference signal resource identifier associated with the at least one channel state information reference signal or synchronization signal block resource.

10. The apparatus according to claim 6, wherein the at least one memory and computer program code are further configured, with the at least one processor, to cause the apparatus at least to:

generate different combinations of channel state information reference signal resource sets or resources, with or without synchronization signal block resources, to be used as transmission formats for fine time-frequency tracking reference signal; and configure the user equipment with the different combinations for use as the transmission formats.

11. A method, comprising:

receiving an indication, from a network as a part of a channel state information reference signal resource set definition via radio resource control signaling, of one or more tracking reference signal purposes for at least one of a channel state information reference signal resource defined in the channel state information reference signal resource set definition is to be within one or more channel state information reference signal resource sets; and performing synchronization tracking based on the indication received from the network, wherein an information element comprising the indication is a boolean value information element and when it is present and set to 'ON,' the at least one of the channel state information reference signal resource defined in the channel state information reference signal resource set definition is targeted for the one or more tracking reference signal purposes.

12. The method according to claim 11, wherein a periodic channel state information reference signal resource is included in one channel state information reference signal resource set of the one or more channel state information reference signal resource sets and an aperiodic channel state information reference signal resource is included in another one channel state information reference signal resource set of the one or more channel state information reference signal resource sets.

13. The method according to claim 11, wherein the receiving of the indication comprises receiving a tracking reference signal information parameter via the radio resource control signaling.

14. The method according to claim 13, wherein the tracking reference signal information parameter comprises at least one of a first element including the Boolean value information element associated with the at least one channel state information reference signal resource for tracking reference signal purposes, a second element including a channel state information reference signal resource channel state information set identifier or synchronization signal block resource indicator, or a third element including at least one channel state information reference signal resource identifier associated with the at least one channel state information reference signal or synchronization signal block resource.

15. An apparatus, comprising:

at least one processor; and at least one memory comprising computer program code, the at least one memory and computer program code configured, with the at least one processor, to cause the apparatus at least to receive an indication, from a network as a part of a channel state information reference signal resource set definition via radio resource control signaling, of one or more tracking reference signal purposes for at least one of a channel state information reference signal resource defined in the channel state information reference signal resource set definition is to be within one or more channel state information reference signal resource sets; and perform synchronization tracking based on the indication received from the network, wherein an information element comprising the indication is a boolean value information element and when it is present and set to 'ON,' the at least one of the channel state information reference signal resource defined in the channel state information reference signal resource set definition is targeted for the one or more tracking reference signal purposes.

16. The apparatus according to claim 15, wherein a periodic channel state information reference signal resource is included in one channel state information reference signal resource set of the one or more channel state information reference signal resource sets and an aperiodic channel state information reference signal resource is included in another one channel state information reference signal resource set of the one or more channel state information reference signal resource sets.

17. The apparatus according to claim 15, wherein when receiving the indication, the at least one memory and computer program code are configured, with the at least one processor, to cause the apparatus at least to receive a tracking reference signal information parameter via the radio resource control signaling.

18. The apparatus according to claim 17, wherein the tracking reference signal information parameter comprises at least one of a first element including the Boolean value information element associated with the at least one channel state information reference signal resource for tracking reference signal purposes, a second element including a channel state information reference signal resource channel state information set identifier or synchronization signal block resource indicator, or a third element including at least one channel state information reference signal resource identifier associated with the at least one channel state information reference signal or synchronization signal block resource.

19. A non-transitory computer readable medium comprising program instructions for causing an apparatus to perform:

generating an information element as a part of a channel state information reference signal resource set definition via radio resource control signaling to indicate, to a user equipment, one or more tracking reference signal purposes for at least one of a channel state information reference signal resource defined in the channel state information reference signal resource set definition; and transmitting the information element to the user equipment to make the user equipment aware of at least one channel state information reference signal resource within one or more channel state information reference signal resource sets targeted for the one or more tracking reference signal purposes, wherein the information element is a boolean value information element and when it is present and set to 'ON,' the at least one of the channel state information reference signal resource defined in the channel state information reference signal resource set definition is targeted for the one or more tracking reference signal purposes.

20. A non-transitory computer readable medium comprising program instructions for causing an apparatus to perform:

receiving an indication, from a network as a part of a channel state information reference signal resource set definition via radio resource control signaling, of one or more tracking reference signal purposes for at least one of a channel state information reference signal resource defined in the channel state information reference signal resource set definition is to be within one or more channel state information reference signal resource sets; and performing synchronization tracking based on the indication received from the network, wherein an information element comprising the indication is a boolean value information element and when it is present and set to 'ON,' the at least one of the channel state information reference signal resource defined in the channel state information reference signal resource set definition is targeted for the one or more tracking reference signal purposes.

* * * * *